Figure 1:
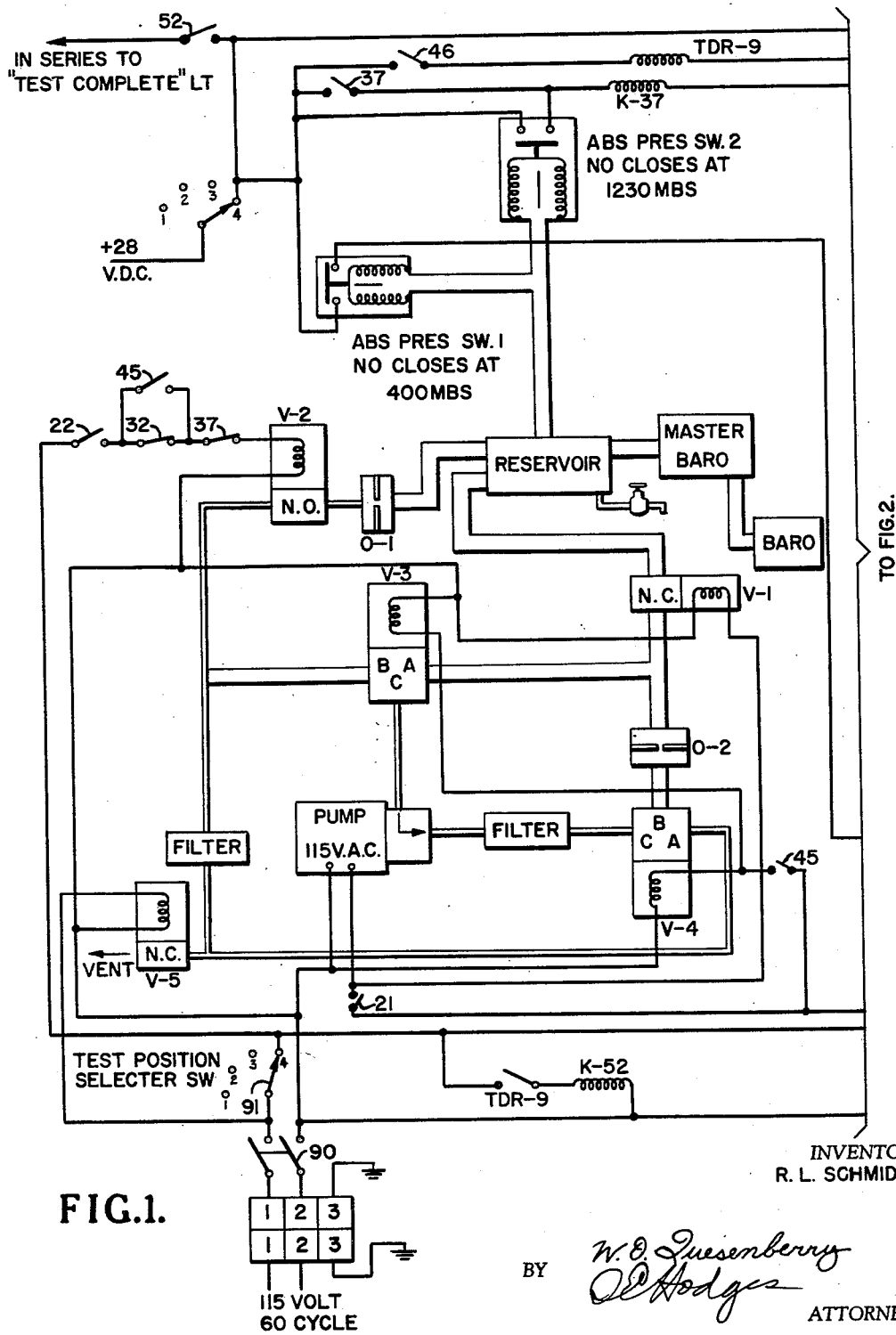

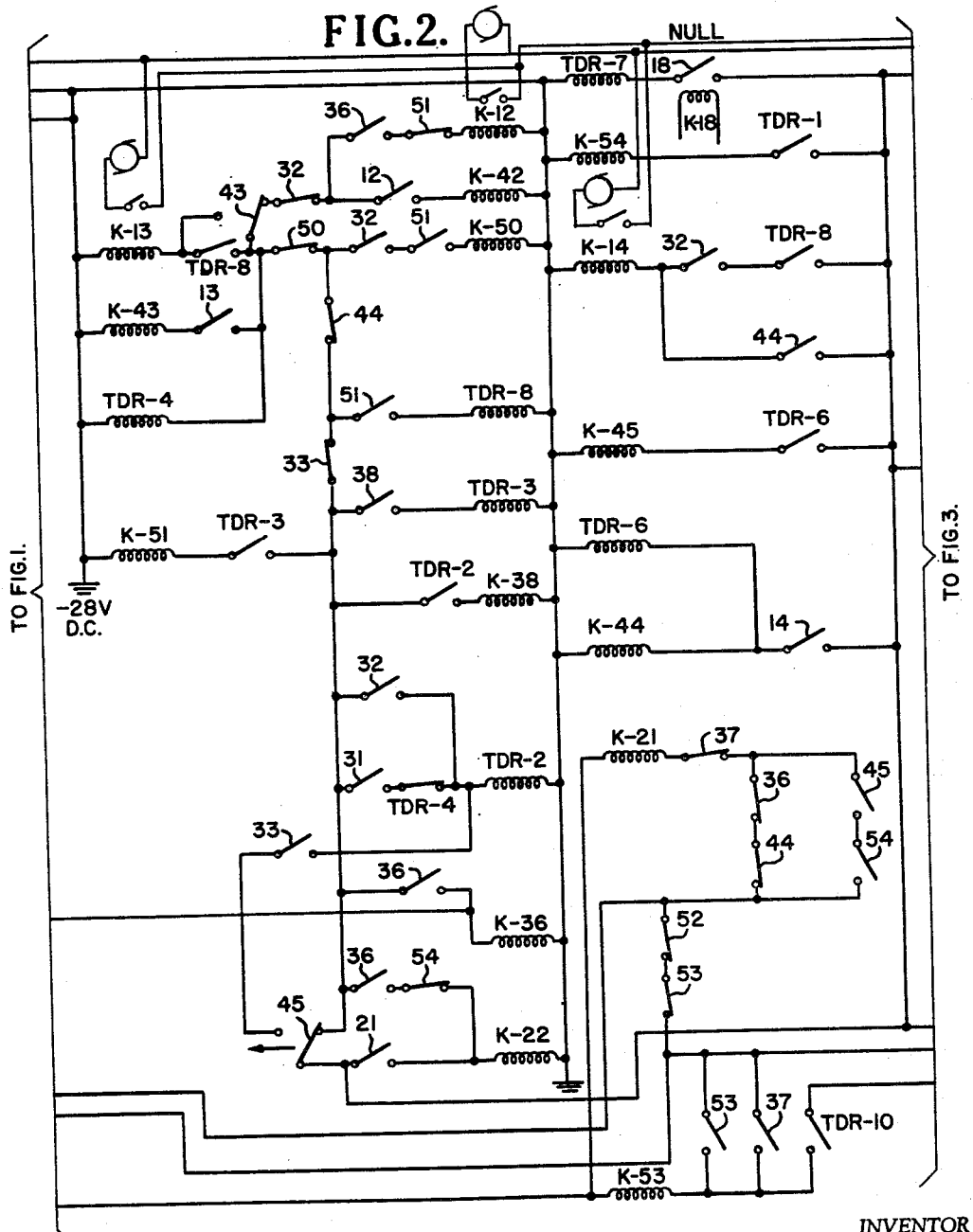

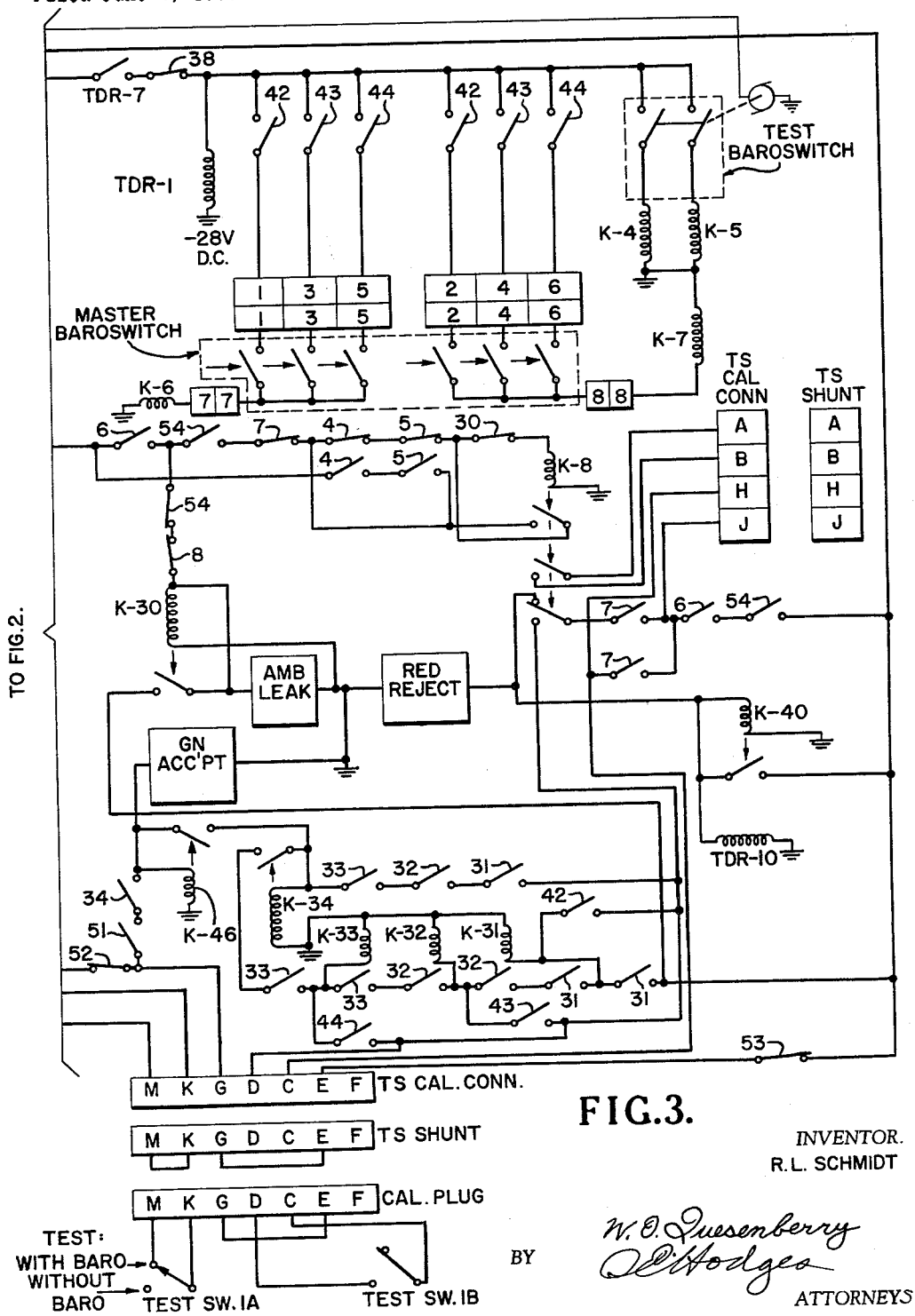

3,165,914
TEST SET FOR BAROMETRIC PRESSURE SWITCHES
Robert L. Schmidt, Silver Spring, Md., assignor to the United States of America as represented by the Secretary of the Navy
Filed June 2, 1960, Ser. No. 33,604
9 Claims. (Cl. 73—4)
(Granted under Title 35, U.S. Code (1952), sec. 266)

The invention described herein may be manufactured and used by or for the Government of the United States of America for governmental purposes without the payment of any royalties thereon or therefor.

This invention relates generally to testing apparatus and pertains more particularly to equipment capable of determining the operating accuracy of a barometric pressure switch by providing a pressure environment which simulates the operating environment of the apparatus.

In the field of baroswitch testing, it has been the general practice to employ a test chamber for testing each individual switch. Although such devices have served the purpose, they have not been entirely satisfactory under all conditions of service for the reason that considerable difficulty has been experienced in putting the individual tested units into a workable group assembly.

The general purpose of this invention is to provide a baroswitch testing unit which embraces all the advantages of similar employed testing units and possesses none of the aforedescribed disadvantages. To attain this, the present invention contemplates a new and improved baro testing unit which will test the assembled group known as a baroswitch assembly. Should any one of the baroswitches be defective, the entire assembly will be rejected.

More specifically the apparatus of this invention provides for automatically and sequentially testing pressure operated switches or baroswitches for proper operation at three discrete pressure levels which correspond to three altitudes, for example, 15,000 feet, 9,000 feet and —2,500 feet. A pneumatic system is employed for providing the three discrete pressure levels at which the baroswitches are tested. The pneumatic system further provides for varying each discrete pressure level over a range within which the baroswitches will normally be caused to operate. The pressure variation occurs at a rate which simulates the drive rate of a vehicle housing such baroswitches under actual operating conditions. The baroswitches are physically adjusted for each discrete pressure level, that is the electrical contacts of the baroswitches are set at a particular spacing for each of the pressure levels at which the switches are tested. An upper limit and a lower limit master baroswitch is employed for comparison with the baroswitches being tested, for each of the three pressure levels. Electrical circuits are provided for indicating the operation of the baroswitches under test. For example, three relays must be energized in the proper sequence before an acceptance of the tested baroswitches is indicated.

It is an object of this invention to provide an apparatus for producing an adjustable rate of change of pressure to simulate "dive rates" experienced by the apparatus to be tested.

It is another object to provide an apparatus with pressure environment for simulating the operating environment for three check point evaluations.

It is still another object to provide an apparatus with an accurate standard barometric switch above and below the check point of the baroswitch of the test and visual indicating apparatus for disclosing the results of the test.

A further object is to provide a testing apparatus for testing baroswitches with a minimum number of connections and a minimum amount of time.

Further objects and the entire scope of the invention will become further apparent in the following detailed description and in the appended claims. The accompanying drawings display the general construction and operational principles of the invention; it is to be understood, however, that such drawings are furnished only by way of illustration and not limitation thereof, and in which:

FIGS. 1 to 3 taken together disclose a schematic view of the invention.

Referring now to the drawings, wherein like reference characters designate like or corresponding parts throughout the several views and to FIGS. 1 to 3 generally, there is disclosed thereon a baro test set for determining the operating accuracy of the barometric pressure switches in a pressure environment which simulates the operating environment of the application. The rate of change of pressure is adjusted to simulate "dive rate" at three different check point elevations. The operating point of each baroswitch is determined electrically and checked against a standard or "master" barometric switch of high accuracy. The standard barometric switches are accurately set against a recognized absolute pressure standard to close at pressures which are equivalent to elevations above and below a check point altitude of a baroswitch under test. Acceptance is limited to tested baroswitches which close, with increasing pressure being applied to the baroswitch under test and the standard baroswitches, only if the tested baroswitch closes after the "upper" standard switch, and before the "lower" standard switch.

The baroswitches to be tested are in assembly units of two each which are referred to herein as a baroswitch assembly. The setting system consisting of electrical and electronic components with three control transformers which are held fixed at prescribed settings to set the baroswitch at each check point elevation. Each of the three control transformers are sequentially connected to a servo motor. The servo motor engages a mechanism such as a threaded bolt and nut to change the spacing between the frame members of the baroswitches to be tested and hence change the spacing between the contacts of the baroswitches. Each of the control transformers will precisely control the servo motor to space the contacts of the baroswitch at a distance for operation at a particular pressure level. The first control transformer will cause baroswitch contacts to be separated at a distance such that the baroswitches will operate at a pressure level corresponding to an altitude of 15,000 feet. The second control transformer will cause the proper baroswitch contact spacing for operation at a pressure level corresponding to 9,000 feet and the third control transformer will cause the contacts of the baroswitches to be separated a distance for proper operation at a pressure corresponding to —2,500 feet. The complete setting system is not shown as such a system is generally well known in the art. The ground reference voltage as shown in the drawings is a minus 28 volts D.C.

The operation of the automatic baroswitch test set will now be described. The test set is energized through a 60 cycle source of alternating current by closing circuit breaker 90. This will energize valve V-5, thereby opening and venting the pneumatic system of the baroswitch test set to the atmosphere. Selector switch 91 has a number of positions thereon which may be used to monitor other electrical properties of the baroswitches to be tested. For testing the baroswitch assembly, it is necessary that such a switch be set to position 4 which immediately energizes relay K-21 which starts the vacuum pump evacuating the system and K-21 also energizes K-22 which closes valve V-2. Valve V-1 is energized open whenever the pump operates and releases when the pump stops.

Vacuum performance of the pump results because valve V-3 and V-4 are not energized and the flow of air through these valves is through ports A and C. The reservoir is evacuated and the system air is discharged from port A of valve V-4 to valve V-5 to the atmosphere. The vacuum pump will continue to evacuate the system reservoir until the absolute pressure switch 1 closes at 400 millibars pressure, which is equivalent to 23,574 feet of elevation as defined by standard atmosphere tables.

When absolute pressure switch 1 closes, K-36 is energized and one contact of K-36 locks K-36 in the energized position. When K-36 is energized K-21 is deenergized thereby stopping the pump and closing valve V-1. Solenoid K-36 also maintains solenoid K-22 energized by means of contact 36 which keeps valve V-2 closed, hence the system is closed holding the pressure at approximately 400 millibars.

Solenoid K-36 also energizes solenoid K-12, by means of contact 36, which connects a 15,000 foot control transformer into the setting circuit, not shown. It will be noted that relays K-12, K-13 and K-14 have additional contacts (not shown) which contact the appropriate leads of the setting control transformers in the setting circuits—K-12 connects the 15,000 foot control transformer; K-13 connects the 9,000 foot control transformer; and K-14 connects the minus 2,500 foot control transformer. When the relay K-12 is energized, the setting system changes the evaluation setting of baroswitch K-4, K-5 to the first check point at 15,000 feet.

Relay K-12 energizes relay K-42 which closes a circuit to the upper gate switch, No. 1 and the lower gate switch, No. 2, in the master or "standard" baroswitch which is the primary standard of the test set. Relay K-42 also closes a circuit to the coil of relay K-31 which will retain the "ACCEPT" decision if the baroswitch is acceptable for the first check point. Since the relay TDR-7 is not yet closed, no current is applied to the baroswitch test evaluation circuit when relay K-42 is closed. The elevation setting of the baroswitch K-4, K-5 is completed when the setting circuit indicates a "null." When the null occurs, the setting system null relay K-18 will be energized, thereby closing contact 18 in the test circuit. When the null occurs, contact 18 will energize time delay relay TDR-7, a three second time delay relay which is included here to wait for a stable null from the setting system. Three (3) seconds after the null occurs, which closed relay K-18, the time delay relay TDR-7 contact will trip. In addition to energizing the baroswitch test evaluation circuit, time delay relay 7 also energizes a coil on time delay relay TDR-1, which is a two second time delay relay.

Time delay relay TDR-1 is included to permit the evaluation circuit to detect a leak in the pneumatic system. It can be shown that a possibility of accepting a defective baroswitch would exist if a leak was sufficient to close the upper gate before the evaluation circuit was energized. If the evaluation circuit was energized after the upper gate closed as a result of such a leak, the decision would depend on the response on the relays in the evaluation circuit. The reliability of the test set performance demands that the possibility of accepting a defective unit must be prevented, therefore, time delay relay TDR-1 will foreclose this possibility. During the two seconds required before the contacts of time delay relay TDR-1 trip, the evaluation circuit is energized, and will detect a leak in the pneumatic system during this period, if the upper gate switch is closed. Upon a leak being detected relay K-30 will energize the "LEAK" lights immediately notifying the operator of this defect. If the upper gate is closed during this two second period, relay K-6 will be energized and this will energize relay K-30 which locks itself in and opens the circuit to the coil of relay K-8, which makes it impossible to render an "ACCEPT" decision. When the "dive" follows, and the lower gate closes, which energizes relay K-7, the "REJECT" circuit will be energized.

When the reject circuit is energized, relay K-49 is energized which locks itself in and the coil of time delay relay TDR-10 is energized. One-half second after the reject circuit is energized and has lighted the "REJECT" light, the contacts of time delay relay TDR-10 closes the circuit to the coil of relay K-53, which opens the test and control circuits, but maintains "LEAK" and "REJECT" lights on. This would terminate the test on this particular baroswitch, and the operator would determine whether the leak was in the baroswitch assembly or in the test set; by testing a baroswitch assembly which was known to be good. If the test set is defective because of a leak, another test set would be used.

Time delay relay TDR-10 provides a short time delay to be sure that relay K-49 locks itself in before the evaluation circuit is open. A "LEAK" light and the "REJECT" light will remain lighted so long as the selector switch is in the test position 4 and the circuit breaker is on. The test "complete" light would not be lighted because relay K-52 has not been energized.

This leak detection delay will occur at each of the three check points in the same manner as described and therefore will not be repeated in the description which follows.

If no leak is detected, then time delay relay TDR-1 contact trips two seconds after time delay relay TDR-7 closes. Time delay relay TDR-1 energizes relay K-54 which drops the leak detection circuit out of the evaluation circuit.

Relay K-54 also opens the circuit to relay K-22, and this opens the circuit to valve V-2 which opens the pneumatic system thereby venting it to the atmosphere through orifice O-1 which controls the vent rate to simulate the "dive rate" of 875 plus or minus 100 feet per second for the first check point at 15,000 feet. During the dive, the baro evaluation circuit will render and accept decision if, and only if, neither baroswitch closes before relay K-6 is energized, and only if both baroswitch relays K-4 and K-5 close before relay K-7 is energized. If the tested baroswitch is acceptable, relay K-8 is held energized in the "ACCEPT" position, and when relay K-7 is energized relay K-31 coil will be energized. Relay K-31 locks itself closed thereby summing up the fact that the first check point has been acceptable. The accept decision on the first check point will not energize coil K-34 or coil K-46 which must be energized to obtain "ACCEPT" indication from the green "ACCEPT" light because of open contacts 32 and 33. Relays K-31, K-32, and K-33, therefore, constitute the summation circuit for the baro evaluation circuit. It can be seen that the green "ACCEPT" light will not go on unless relay K-31 closes first followed by relay K-32 and finally by relay K-33. The summation circuit is non-reversible, and will not light the green "ACCEPT" light if only K-33 is energized. The evaluation circuit, therefore, insists on the control circuit performing properly.

When relay K-31 is energized, summing up the first accept decision, the dive continues; when relay K-31 energizes the time delay relay TDR-2, one second later the time delay relay TDR-2 contacts energized relay K-38. Relay K-38 opens up the baro evaluation circuit, permitting time delay relay TDR-1 contacts to reopen, which deenergizes relay K-54.

Deenergized relay K-54 again energizes relay K-22 which energizes valve V-2 causing it to close. This closure occurs approximately one second after relay K-31 is energized, and valve V-2 closing terminates the dive. This one second delay permits the pressure in the system to advance beyond the closing valve from the lower gate switch, to be sure that relay K-7 closes and remains closed in the static pneumatic condition. The pressure in the pneumatic system at the instant of valve V-2 closure depends on the closing pressure of the lower gate switch, the accuracy of the time delay relay TDR-2, and the control of the dive rate. This is not critical, and for all practical purposes the pressure at the instant of valve V-2 closure after the first check point evaluation will be equivalent to about 13,500 feet of elevation. This is well above the upper gate switch setting of the next check point, the area of latitude is well evident.

Returning to the control circuit, when relay K-38 is energized (one second after relay K-31 was energized) thereby also energizing time delay relay TDR-3. One second later time delay relay TDR-3 contacts energized relay K-51 which opens the circuit to relay K-12, and this opens the circuit to relay K-42. Relay K-12 disconnects the 15,000 foot control transformer from the setting system, and relay K-42 disconnects the upper and lower gate switches from the baro elevation circuit (under no load). Both of these actions occur after the baro circuit is opened and one second after the dive terminates.

When relay K-12 is deenergized by relay K-51, the contacts of relay K-18 open, and time delay relay TDR-7 contacts open. Since relay K-38 is energized, the baro setting is not changed because the amplifier output circuit is opened by K-38. The contacts on relay K-51 also energize the coil of time delay relay TDR-8. One second later, TDR-8 contacts energize relay K-13, and this energizes relay K-43 locking in K-13 and K-43, and also energizing the coil of time delay relay TDR-4 a two second time delay relay.

Time delay relay TDR-8 provides a one second delay after the 15,000 ft. control transformer drops out of the setting circuit before the 9,000 ft. control transformer is introduced in the setting circuit. This prevents the baroswitch from experiencing the load of two control transformer units at the same time. It will be observed that one contact of relay K-43 isolates the circuit of relays K-12 and K-42; this is necessary because relay K-51 will soon be unloaded, which would again energize K-12 and K-42 if it were not for relay K-43 contact isolation. Relays K-13 and K-43 (which put the 9,000 ft. control transformer into the setting circuit) are also locked in, and thereby arrange the control transformer for the next check point setting. Relay K-43 connects the upper and lower gates (switches 3 and 4) of the master baroswitch in addition to providing a path for the accept decision to reach the coil of relay K-32.

Two seconds after the 9,000 ft. control transformer is in the setting circuit the contact of time delay relay TDR-4 opens the coil of relay TDR-2. When this occurs, TDR-2, K-38, TDR-3, K-51, and TDR-8 immediately become deenergized. Since the baro is still at 15,000 ft. setting, the null at 9,000 ft. must be achieved before relays TDR-7 and K-54 are energized (hence the contacts TDR-7 and K-38 in the deenergized position) the amplifier output lead is closed and the change of the baroswitch setting is adjusted for the 9,000 ft. setting. Relay K-22 is energized because relay K-54 contacts are closed which thereby keeps valve V-2 closed. When the null at 9,000 ft. is achieved, relay K-18 is again energized closing contact 18 which energizes the coil of time delay relay TDR-7. After three seconds of the sustained "null," relay TDR-7 contacts again trip, energizing the baro evaluation circuit and the coil of relay TDR-1. The same leak detection period of two seconds exists and when the contact of time delay relay TDR-1 trips, relay K-54 is again energized. This opens the circuit to the coil of relay K-22, which in turn opens the circuit to the valve O-1. This time the flow rate through valve O-1 is such that the dive rate of 750±100 ft. per second is simulated as the pneumatic system vents to the atmosphere.

If the baroswitch under test is acceptable at this 9,000 ft. check point, the accept decision will energize the coil of relay K-32 when relay K-7 is energized by the closure of the lower gate switch (switch 4) in the master baro. It will be seen that relay K-32 will not lock itself in unless K-31 has already done so and the accept decision cannot yet reach the "ACCEPT" light.

Energized and locked in relay K-32, energizes the coil of time delay relay TDR-2. Relay K-32 also opens the circuit to valve V-2 and this maintains valve V-2 open allowing the system to vent to the atmosphere. It should be noted that valve V-2 will not close again until relay K-45 and K-22 are closed later in the sequence, hence the pneumatic system will have adequate time to vent to the atmospheric pressure. Relay K-32 also isolates the circuit to relays K-12 and K-42 and thus complete isolation for the balance of the test sequence is obtained. The contact of relay K-32 is necessary because it will restrict the unloading of relay K-43 from reenergizing relays K-12 and K-42. Relay K-43 will be unloaded later in the sequence. Upon closing relay K-32 also has a contact of K-32 which provides a path for coil of relay K-14 which discriminates the closure of time relay delay TDR-8 after the first check point. As was previously stated, the coil of time delay relay TDR-2 is energized by a contact of relay K-32, and one second later the contacts of time delay relay TDR-2 energizes relay K-38 which opened the baro evaluation circuit. Relay K-38 then energizes contact time delay relay TDR-3 and one second later relay TDR-3 contacts again energize relay K-51.

Since relay K-32 is already energized, relay K-51 energizes K-50 which opens the circuit to relays K-13 and K-43 and time delay relay TDR-4. These three relays return to the deenergized position. It can be seen that the contacts of time delay relay TDR-4 close another path to the coil of time delay relay TDR-2, but relay TDR-2 is already energized by relay K-32, hence no effect on TDR-2 is realized. Again one second after the baro evaluation is opened, the 9,000 ft. control transformer and the master gate switches (numbers 3 and 4) are disconnected from their respective circuits by relays K-13 and K-43 opening. Relay contact K-51 also energizes the coil of time delay relay TDR-8 and this time one second after the control transformer and gates have dropped out, the contact of time delay relay TRD-8 energizes the coil of relay K-14 because relay K-32 is closed. Relay K-14 energizes relay K-44, which locks in K-14 and K-44 and connects the —2500 ft. transformer in the setting circuit and provides a path to the upper and lower gate switches (numbers 5 and 6) and a path to the coil of relay K-33, hence, again, time delay relay TDR-8 provides a one second delay from unloading the 9,000 ft. control transformer to connecting of the —2500 ft. transformer. Relay K-14 also energizes the coil of time delay relay TDR-6 and two seconds later the contact of time delay relay TDR-6 energizes the coil of relay K-45.

Relay K-36 has been continuously locked energized throughout the first two tests but must be unlocked in order to prevent the pump from starting again; the contact of relay K-44 is included in the circuit to the coil of relay K-21. Obviously, this circuit to the coil of relay K-21 is now open at two switches K-36 and K-44. When relay K-45 energizes, one contact of relay K-45 unloads the following relays immediately: K-36, K-22, TDR-2, K-38, TDR-3, K-51 and TDR-8. As was earlier stated, when relay K-44 was energized, it isolated the control transformer and gate switch relay used previously, namely, K-13 and K-43, etc., and also deenergized relay K-50.

When relay K-38 is deenergized this time the baroswitch setting will begin to change from the 9,000 ft. elevation to a —2500 ft. elevation because both relay K-38 and time delay relay TDR-7 contacts the amplifier output lead are closed in the deenergized condition.

Relay K-45 has contacts 45 which closes a path to a valve V-3 and V-4 thereby energizing these valves. This will convert the pump into an air compressor for the negative evaluation check point. It can be seen that the ambient air will be pumped into the pneumatic system through valve V-5 through ports B to C of valve V-3 into the pump where it is compressed and discharged through ports C to B of valve V-4 through orifice O-2, thence through valve V-1 into the reservoir, while valve V-2 is closed, all this flow occuring only when the pump is next expected to operate.

Another contact of relay K-45 provides a path to energize valve V-2 around the now open contact of K-32 which has been venting the pneumatic system ever since relay K-32 was energized. Another contact of relay K-45 provides a path to energize the coil of relay K-21 when relay K-54 closes and this will occur when the baro setting nulls at −2500 ft.

When the null at 2500 ft. is achieved the null relay K-18 closes contact 18. After the null has been steady for three seconds, time delay relay TDR-7 contact close, and this energizes the baro elevation circuit, and the coil of time delay relay TDR-1. Again for two seconds the leak detection circuit is in effect even though this function is not effective at this point of the sequence.

Two seconds after time delay relay TDR-7 closes, time delay relay TDR-1 contacts again energize relay K-54. This time K-54 energizes the coil of relay K-21, and relay K-21 energizes relay K-22. Now relay contacts K-22 can energize valve V-2, closing the circuit through already closed contact 45, and contacts 21 which will start the pump compressing atmospheric air in the pneumatic system with the flow following the route previously described. The restricting orifice O-2, regulates the rate of compression into the system to simulate a "dive rate" of 600±100 ft. per second for this check point.

If the baroswitch tested is acceptable at this check point, relay K-7 will close and the coil of relay K-33 will lock closed only if K-32 and K-31 have already done so. This time the accept decision will reach the coil of relay K-34 because relays K-31, K-32 and K-33 are now closed. Relay K-34 locks itself in and provides a path to reach the coil of relay K-46. The pump will continue to compress air into the system until relay K-54 is deenergized. This happens in the following manner. Relay K-33 (energized) closes a circuit to the coil of relay TDR-2 again. One second after the contact of time delay relay TDR-2 energizes relay K-38 which opens up the baro evaluation circuit. This immediately unloads time delay relay TDR-1 which deenergizes relay K-54 and the pump stops compressing. When it does stop, valve V-1 closes but relay K-21 deenergizes relay K-22 which opens the circuit to valve V-2 hence the pneumatic system is vented to the atmosphere again through orifice O-1, V-2 and V-5. Relay K-38 also energizes time delay relay TDR-3 again, and one second later TDR-3 contacts energize relay K-51. Relay K-51 cannot energize time delay relay TDR-8 this time because contact K-33 is open; relay K-51 energizes the coil of K-46. The relay K-46 locks itself on and the green "ACCEPT" light is on.

In order to provide adequate time for the pneumatic system to vent to the atmosphere, time delay relay TDR-9 is used, a six second time delay which starts when relay K-46 closes. Six seconds after relay K-46 closes the contacts of TDR-9 energize relay K-52 and this opens up the control circuit and provides power to the "test complete" light, which will go on if all the previous tests have been completed on the baroswitch assembly.

This terminates testing of the baroswitch assembly and when the circuit breaker is opened, all relays reset to the original position.

It is expected that the time required to test a baroswitch with three operating points will not exceed 8 minutes. The absolute pressure switch No. 2 which would close at 1230 millibars pressure is included in this test set to protect the standard baroswitch from excessive pressure if the pump failed to cut off after the lower gate switch energizes relay K-7 during the −2500 ft. check point operation. If relay K-7 failed to operate here, absolute pressure switch No. 2 is also effective since it would stop the pump and vent the system to atmospheric pressure through valve V-2. When relay K-37 is energized, one of the contacts will energize relay K-53 which locks itself in and opens the baro control and evaluation circuit.

Sufficient calibration connectors are included to monitor and obtain the following information:

(1) The accuracy of the setting system in the test set can be determined by operating a baroswitch simulator which would give a digital indication of the altitude setting.

(2) The "dive rate" can be measured at all three check points by using one of the contacts in relay K-8 which would close when relay K-6 closes and open when K-7 closes, provided a baroswitch is not electrically connected to the test set. This pulse could operate an electric timer.

(4) The pneumatic lead or lag of an element in the baroswitch tested and any element in the standard or master baroswitch can be determined with the 28 volt pulse from pins H and J. This pulse operating a double pole, double throw relay could operate an electric timer which would measure the lead or lag time.

(5) By means of another calibration plug it is possible to operate the test set with or without a baroswitch electrically connected to the test set.

When the baroswitch is not in the circuit, the reject light will light up but the switch position at the calibration plug would prevent the reject impulse from reaching relay K-53 and would route the reject pulse to the accept side of the evaluation circuit thereby continuing the test set operation until the accept light goes on. It is not seen that there would be any real objection to having both the reject and accept lights on whenever the test set were operated without a baro at a calibration station.

Applicant's invention may be assembled in a roll-around cart with the baro switch to be tested mounted on the top of the test set.

From the foregoing description it is submitted to be clearly apparent that applicant has provided a new and novel versatile baro test set for testing baroswitches by means disclosed herein. By use of applicant's device a baroswitch can be tested as a unit or as a separate component when connected to the set by pneumatically and electrically connecting means. This device with variable "dive rate" or rate of change of pressure, which once established at the required value requires no further changes to conduct the test. It is also apparent that the number of manual steps are the minimum with the dependability at the maximum.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A barometric tester for testing baroswitches in a baroswitch assembly comprising a source of power, a pumping device connected to said source of power and having pneumatic means for simulating various discrete pressures above and below sea level, a pneumatic reservoir connected to said pneumatic means, valve means having a restricting orifice connected to said pneumatic reservoir for regulating the rate of change of pressure in said reservoir to simulate a dive rate at each of said discrete pressure levels, a plurality of master baroswitches including an upper limit master baroswitch and a lower limit master baroswitch for each of said discrete pressures, said master baroswitches and said baroswitches in the baroswitch assembly being pneumatically connected to said reservoir, electrical means connecting said master baroswitches and said baroswitches in the baroswitch assembly for indicating the sequence of closing of the baroswitch in said baroswitch assembly as compared with the closing of said master baroswitches.

2. A barometric switch tester in combination with a baroswitch assembly, the baroswitch assembly containing a plurality of baroswitches to be tested, said barometric switch tester comprising pumping means for simulating barometric pressures at various discrete elevations, a pneumatic reservoir connected to said pumping means for maintaining said barometric pressures, valve means connected to said pneumatic reservoir for varying the pressure at a predetermined rate thereby simulating a dive rate, a plurality of master baroswitches connected electrically in parallel with said baroswitches to be tested, said master baroswitches and baroswitches to be tested being in communication with said pneumatic reservoir and responsive to the various barometric pressures, and electrical circuit means for automatically indicating the response of the baroswitches to be tested as compared to said master baroswitches.

3. A barometric tester as recited in claim 2 wherein said pumping means includes an electric motor connected to an electrical control means, a pneumatic pump being driven by said motor, first valve means for connecting said pump to said reservoir so that the pump will evacuate the air in said reservoir thereby creating a partial vacuum to simulate a high altitude elevation, second valve means for connecting said pump to said reservoir so that said pump will compress the air in said reservoir to simulate a negative altitude elevation, said control means being connected to said reservoir for removing the power to said motor when the pressure or vacuum reaches a predetermined level.

4. A barometric tester as recited in claim 3 wherein said control means comprises a source of power, a switching means connected to said source of power, a first control transformer, a second control transformer, a third control transformer, relay means for connecting said first control transformer to said switching means, a solenoid relay means connected to said relay means for controlling said valve means to thereby simulate a dive rate in a predetermined altitude range, an evaluation circuit means electrically connected to said relay means through said master baroswitches and said baroswitches to be tested for indicating the closing of said baroswitches to be tested with respect to said master baroswitches during said simulated dive, said relay means automatically disconnecting said first control transformer and connecting said second control transformer and third control transformer respectively for a similar test, and a summing means connected to said evaluation circuit means for indicating the results of said tests.

5. A testing apparatus for testing a settable baroswitch assembly comprising pneumatic means for simulating various pressures above and below sea level, a pneumatic reservoir connected to said pneumatic means, means located on said reservoir for regulating the change in pressure in said reservoir to simulate a dive rate, test means in said reservoir connected electrically in parallel with the baroswitch assembly under test for determining the accuracy of the baroswitch assembly, said test means and said baroswitch assembly being pneumatically connected to said reservoir, means for selectively and automatically indicating the acceptance or rejection of the baroswitch assembly under test.

6. The testing apparatus of claim 5 wherein the test means includes a plurality of master baroswitches, a pair of said plurality of master baroswitches for operation near a preselected test pressure, a first of said pair of master baroswitch for operation at a pressure just above the selected test pressure, and a second of said pair of master baroswitch for operation at a pressure just below the selected test pressure.

7. The testing apparatus for claim 6 wherein the means for selectively and automatically indicating an acceptance of the baroswitch assembly includes a summing network, a plurality of relays located in said summing network in a series relation, each of said plurality of relays being actuated upon the proper sequential closing of the master baroswitches and the settable baroswitch assembly, whereby when all of said plurality of relays are actuated an acceptance circuit is energized.

8. The testing apparatus of claim 6 wherein the means for selectively and automatically indicating a rejection includes a reject circuit, said reject circuit being energized by the settable baroswitch and said master baroswitches failing to close in a proper sequence.

9. A testing apparatus for testing a settable baroswitch assembly at pressures above and below sea level comprising a pneumatic reservoir, a pneumatic means for changing the pressure in said reservoir, said baroswitch assembly being pneumatically connected to said reservoir, means on said reservoir for simulating a dive pressure therein, standard baroswitches pneumatically connected to said reservoir and electrically connected in parallel with the settable baroswitch assembly said standard baroswitches and the settable baroswitch responsive to the pressures of said reservoir, and electrical means for selectively indicating the response of the settable baroswitch assembly as compared to said standard baroswitch after each dive.

References Cited by the Examiner
UNITED STATES PATENTS

| | | | |
|---|---|---|---|
| 2,310,974 | 2/43 | Lumm | 73—4 |
| 2,478,938 | 8/49 | Osterhus | 73—4 |
| 2,615,327 | 10/52 | Foust et al. | 73—4 |
| 2,893,236 | 7/59 | Conn et al. | 73—4 |
| 3,060,718 | 10/62 | Malkiel | 73—4 |

ISAAC LISANN, *Primary Examiner.*